(12) United States Patent
Beber et al.

(10) Patent No.: US 8,701,531 B2
(45) Date of Patent: Apr. 22, 2014

(54) DICING ELEMENT ASSEMBLY FOR A FOOD PROCESSOR

(71) Applicant: Whirlpool Corporation, Benton Harbor, MI (US)

(72) Inventors: Kevin J. Beber, Granger, IN (US); John A. Colasanti, Jenison, MI (US); Arren J. McCormick, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/733,969

(22) Filed: Jan. 4, 2013

(65) Prior Publication Data

US 2013/0118327 A1 May 16, 2013

Related U.S. Application Data

(63) Continuation of application No. 13/556,438, filed on Jul. 24, 2012, now Pat. No. 8,365,645, which is a continuation of application No. 12/553,325, filed on Sep. 3, 2009, now Pat. No. 8,250,959.

(51) Int. Cl.
*B26D 3/18* (2006.01)

(52) U.S. Cl.
USPC .................................. 83/13; 83/932; 83/857

(58) Field of Classification Search
USPC ........ 83/932, 954, 698.11, 856–858, 13, 167, 83/168; D7/678, 679, 693, 381, 673; 30/114–117, 287, 299, 304
See application file for complete search history.

(56) References Cited

U.S. PATENT DOCUMENTS

| | | | | |
|---|---|---|---|---|
| 2,245,978 A * | 6/1941 | Hyland | ............................ | 83/553 |
| 2,299,092 A * | 10/1942 | Johnson | ....................... | 83/425.1 |
| 2,953,853 A * | 9/1960 | Tieman | .............................. | 83/57 |
| 3,142,905 A * | 8/1964 | Strasbaugh | ..................... | 83/620 |
| 3,277,574 A * | 10/1966 | Giasi | ............................ | 83/651.1 |
| 3,664,396 A * | 5/1972 | Tremblay | ....................... | 425/152 |
| 4,038,892 A * | 8/1977 | Popeil | .............................. | 83/874 |
| 4,106,620 A * | 8/1978 | Brimmer et al. | .............. | 206/363 |
| 4,190,208 A * | 2/1980 | Schaeffer et al. | ............... | 241/92 |
| 4,579,028 A * | 4/1986 | Neidhardt | ........................ | 83/109 |
| 4,599,928 A * | 7/1986 | Oker | ............................ | 83/581.1 |
| 4,700,903 A * | 10/1987 | Henn | ......................... | 241/101.2 |
| 5,245,902 A * | 9/1993 | Pereira | ....................... | 83/435.19 |
| 6,209,439 B1 * | 4/2001 | Repac et al. | ..................... | 83/858 |
| 6,435,080 B1 * | 8/2002 | Zarlengo | .......................... | 99/510 |
| 6,732,622 B2 * | 5/2004 | Vincent | ........................... | 83/247 |
| 7,191,691 B2 * | 3/2007 | Kaposi | ............................ | 83/167 |
| D605,907 S * | 12/2009 | Gorskey et al. | ................ | D7/678 |
| D611,779 S * | 3/2010 | Campbell | ....................... | D7/673 |
| 7,762,169 B2 * | 7/2010 | Kaposi | ............................ | 83/167 |
| 8,051,769 B2 * | 11/2011 | Conti et al. | ...................... | 99/537 |
| 8,250,959 B2 * | 8/2012 | Beber et al. | ...................... | 83/857 |
| 8,365,645 B2 * | 2/2013 | Beber et al. | ...................... | 83/857 |
| 2004/0055437 A1 * | 3/2004 | Engdahl | ........................... | 83/597 |
| 2009/0044708 A1 * | 2/2009 | Repac et al. | ..................... | 99/537 |
| 2009/0193983 A1 * | 8/2009 | So | .................................... | 99/537 |
| 2010/0095821 A1 * | 4/2010 | Cheung et al. | ............. | 83/435.19 |
| 2010/0175569 A1 * | 7/2010 | Aby-Eva et al. | ................ | 99/537 |

* cited by examiner

*Primary Examiner* — Sean Michalski

(57) ABSTRACT

A food processing dicing method and assembly is disclosed. The food processing dicing assembly may comprise a dicing element having multiple dicing openings through which food may pass, a frame configured to selectively retain the dicing element, and a management tool having multiple projections sized to be received by the dicing openings, the management tool may include at least one coupling element for releasably coupling the management tool to at least one of the dicing element and the frame.

20 Claims, 9 Drawing Sheets

DICING ELEMENT ASSEMBLY FOR A FOOD PROCESSOR

CROSS-REFERENCE TO RELATED APPLICATIONS

This application is a continuation of U.S. application Ser. No. 12/553,325, filed Sep. 3, 2009, and U.S. application Ser. No. 13/556,438, filed Jul. 24, 2012, which are incorporated herein by reference in their entirety.

BACKGROUND OF THE INVENTION

Food processors are used to prepare food items by conducting a processing operation, such as slicing, dicing, grating, or shredding, on the food item. Each processing operation is conducted by a different processing tool, which must be replaced when switching between each processing operation. The processing tool is also switched when different size food items are desired for the same processing operation. Most processing tools have sharp blades or edges that must be accounted for during handling.

In addition, handling the processing tools can be difficult to do in a sanitary manner because it is difficult to handle the processing tool without touching the parts of the processing tool that come into contact with the food item. When the food processing operation is complete, some food may remain within parts of the processing tool. This food may be difficult to remove during a normal washing procedure.

SUMMARY OF THE INVENTION

A dicing element assembly comprises a dicing element having multiple elements defining multiple openings through which food may pass and a management tool having multiple projections sized to be received by the dicing openings, with at least some of the projections having a coupling element for releasably coupling the dicing elements when the projections are received within the dicing openings. When the projections are received within the dicing openings, the coupling element couples with the dicing element and a user may move the dicing element by moving the management tool without touching the dicing element.

DESCRIPTION OF THE EMBODIMENTS OF THE INVENTION

Figure 1:
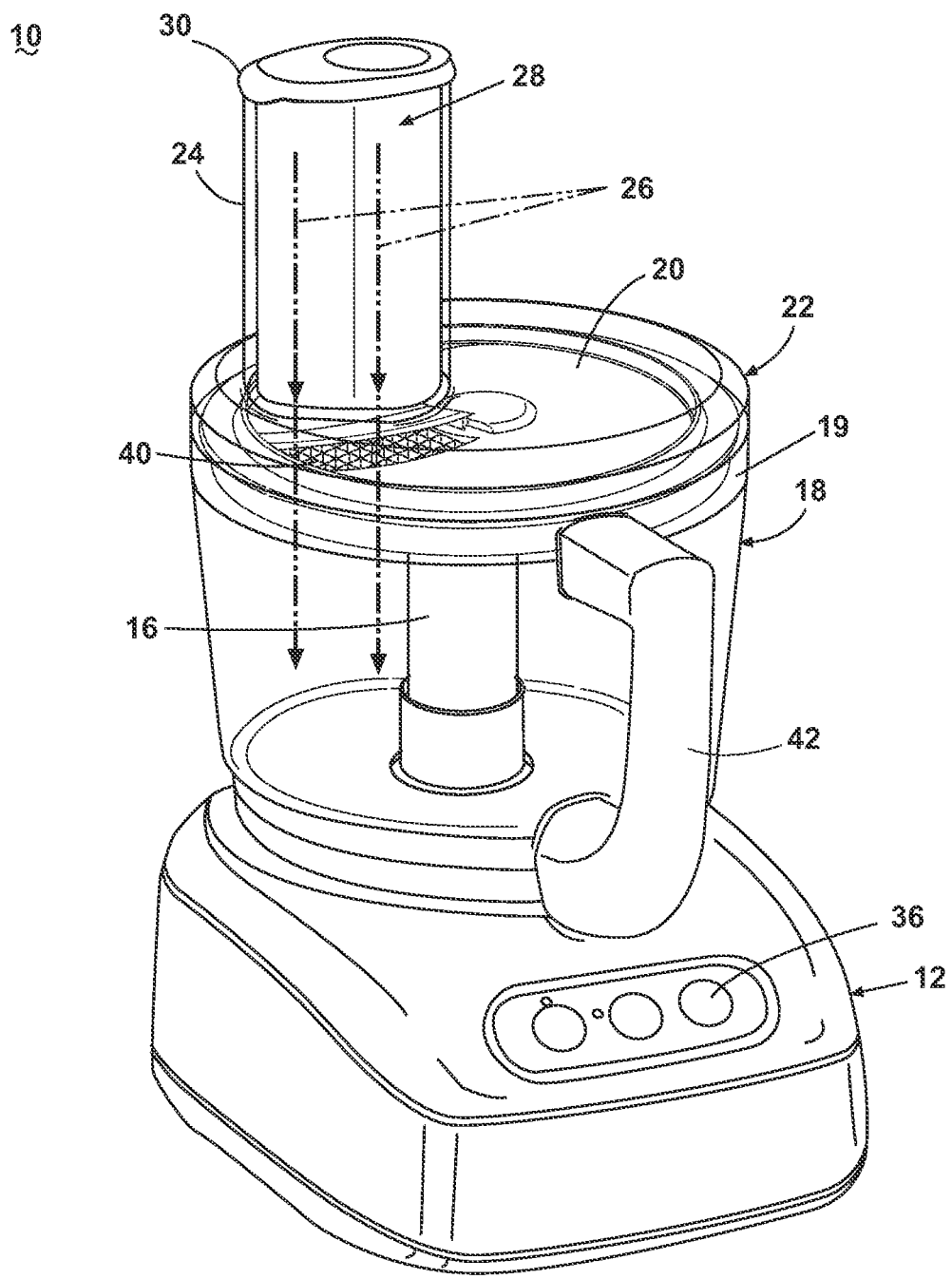
FIG. 1 is a perspective view of a food processor according to a first embodiment of the invention.

Referring now to the figures, FIG. 1 illustrates a food processor 10 according to one embodiment of the invention. The food processor 10 shares many features of a conventional food processor, which will not be described in detail herein except as necessary for a complete understanding of the invention. The food processor 10 includes a base 12 of the food processor 10. The base 12 may include a motor 14 (FIG. 2) having an output shaft 16. A receptacle or a bowl 18 for receiving the processed food, usually made of transparent plastic is supported on the base. The bowl 18 terminates in an open top defined by a lip 19.

A removable lid 22 may be removably received on the bowl 18. Thus, the bowl 18 may be closed by the lid 22, which may be removably secured to the bowl 18 by a snap-fit, a twist-lock arrangement, or any other suitable means of attachment. The bowl 18 and lid 22 may collectively form a food processing chamber. A feed tube 24 extends upwardly from the lid 22. A food pusher 28 may be sized to slide through the feed tube 24 and may be used to push food items through the feed tube 24. A stop, in the form of a flange 30, is provided on the food pusher 28 to limit the insertion of the food pusher 28 into the feed tube 24. The bowl 18 and lid 22 are illustrated as being transparent, but they need not be.

The bowl 18, lid 22, and feed tube 24 may be collectively referred to as a housing into which the food is introduced and processed. It is also possible for the base 12 to be a part of the housing. However, in the illustrated embodiment, the housing is supported by the base 12.

A cutting tool 20 and dicing tool 40 may be located within the housing. As illustrated, the cutting tool 20 is supported on the output shaft 16 and the dicing tool 40 is supported by the bowl 18, such as by press-fitting into the open top of the bowl 18. For the purposes of this description, the term "dicing" is used to refer to any process in which food is cut or divided into multiple components. Non-limiting examples including cutting the food into cubes, long, thin strips (also known as julienne) or any other polyhedral or cylindrical shape. The food can be cut by the dicing tool 40 in combination with the cutting tool 20 such that the cut food has the same dimension along all three x, y and z axes, such as when food is cubed. Alternatively, the food can be cut by the dicing tool 40 and cutting tool 20 such that at least one of the dimensions is different from the other two dimensions, such as may be desirable when making French fries, for example, where the food is processed into square-shaped strips.

Figure 2:
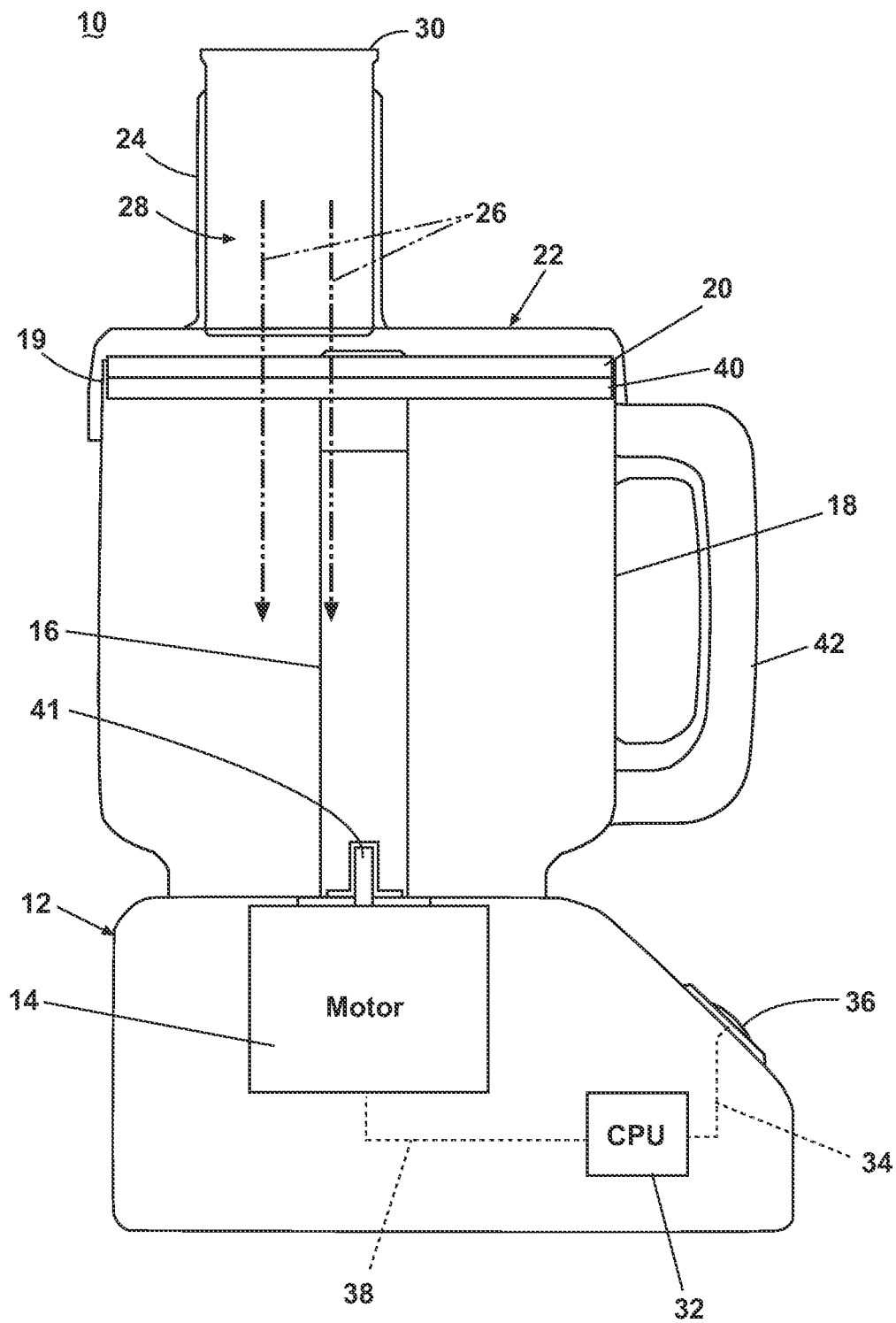
FIG. 2 is a schematic view of the food processor of FIG. 1 illustrating a food processing path through the food processor and its relationship with a cutting tool and dicing tool.

Referring to FIG. 2, a food processing path 26, illustrated by the spaced, dashed line, extends through the housing. The feed tube 24 forms an inlet to and part of the food processing path 26. In this case, the lid 22 and feed tube 24 act as a food guide or a food chute configured to receive food for processing. The food processing path 26 extends from the feed tube 24 through the cutting tool 20 and a portion of the dicing tool 40. The food processing path 26 ends when the processed food is deposited in the bowl 18.

A control system may be provided for controlling the operation of the food processor 10. The control system as illustrated includes a controller 32, which is electrically coupled through a user interface lead 34 to a user interface or control panel 36. The control panel 36 may be provided on the base 12 and may include operational controls such as dials, lights, switches, and displays enabling a user to control the operation of the food processor 10. The motor 14 may be electrically coupled through a control lead 38 to the controller 32. The food processor 10 may be preprogrammed with a number of different food processing options from which a user may select a food processing option to process a food item.

Figure 3:
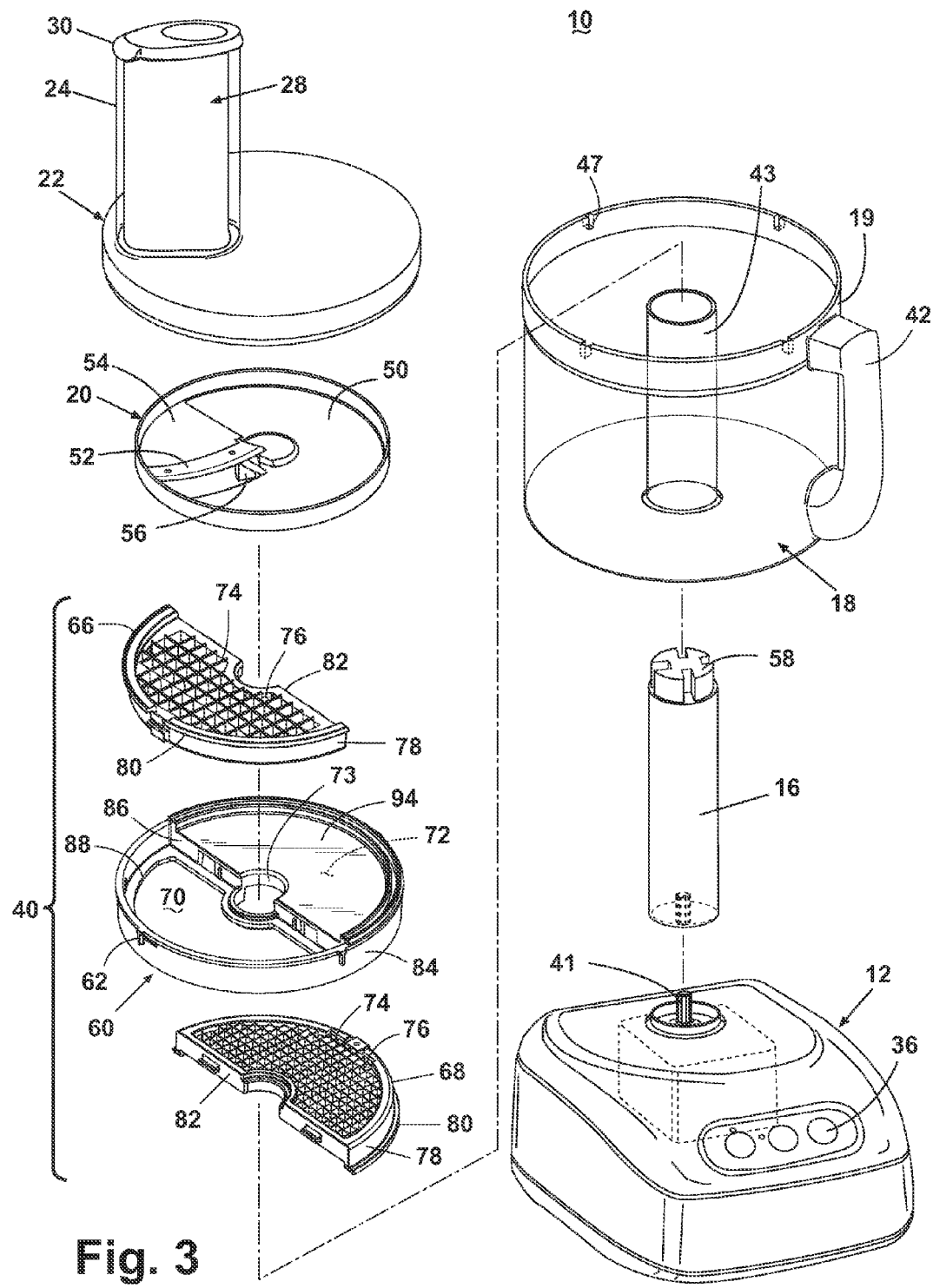
FIG. 3 is an exploded view of the food processor of FIG. 1.

With reference to FIG. 3, the different elements of the food processor 10 will be described in greater detail. A drive shaft 41 extends from the base 12. The drive shaft 41 is operably coupled with the motor 14, and may be used to provide rotational movement to the output shaft 16 that extends into the food processing chamber formed by the bowl 18 and the lid 22.

A handle 42 is provided on the bowl 18 so that a user may more easily maneuver the bowl 18. A guide 43 projects into the bowl 18, within which the output shaft 16 is received. The bowl 18 may be secured onto the base 12 and around the output shaft 16 by a snap-fit, a twist lock arrangement, or any other suitable means of attachment. The bowl 18 may further be provided with a plurality of keyways 47 in the lip 19 of the bowl 18.

The cutting tool 20 is illustrated as being a rotatable cutting disc having a planar portion 50. A cutting blade 52 is provided above the planar portion 50 and acts to cut food as the cutting tool 20 is rotated through the food processing path 26. A ramp portion 54 slopes from the cutting blade 52 to the planar portion 50. The ramp portion 54 acts to push the cut food through the dicing tool 40 after it has been cut by the cutting tool 20. The cutting tool 20 and cutting blade 52 may be made of metal or any other suitable material. Other cutting tools, especially non-disc-shaped cutting tools may be used.

The cutting tool 20 may be operably coupled to the output shaft 16 above the dicing tool 40 by a hub 56 that is complementarily keyed to mate with an upper end 58 of the output shaft 16 such that rotation of the output shaft 16 will rotate the cutting tool 20. The cutting tool 20 is selectively moveable through the food processing path 26 and the cutting blade 52 acts to cut food as it passes through the food processing path 26.

The dicing tool 40 may include a frame 60 having keys 62 and first and second dicing elements 66, 68 that may be removably carried by the frame 60. The frame 60 is a ring frame having keys 62 that locate the dicing tool 40 within the bowl 18. The keys 62 may be received by the keyways 47 in the lip 19 of the bowl 18 for securing the frame 60 to the bowl 18. The frame 60 may include a first compartment 70 and a second compartment 72. A central portion 73 capable of receiving the output shaft 16 may be formed in the center of the frame 60 between the first and second compartments 70, 72. It is contemplated that the dicing tool 40 may have more than two dicing elements. Each dicing element will typically have different processing functionality.

The output shaft 16 may go through the central portion 73 of the dicing tool 40 and the dicing tool 40 may be received within the lip 19 of the bowl 18. The keys 62, and corresponding keyways 47 on the bowl 18, locate the dicing tool 40 within the bowl 18. More specifically, at least a portion of the frame 60 is press-fit against the lip 19. Alternatively, the dicing tool 40 may be mounted to the lid 22.

Figure 4:
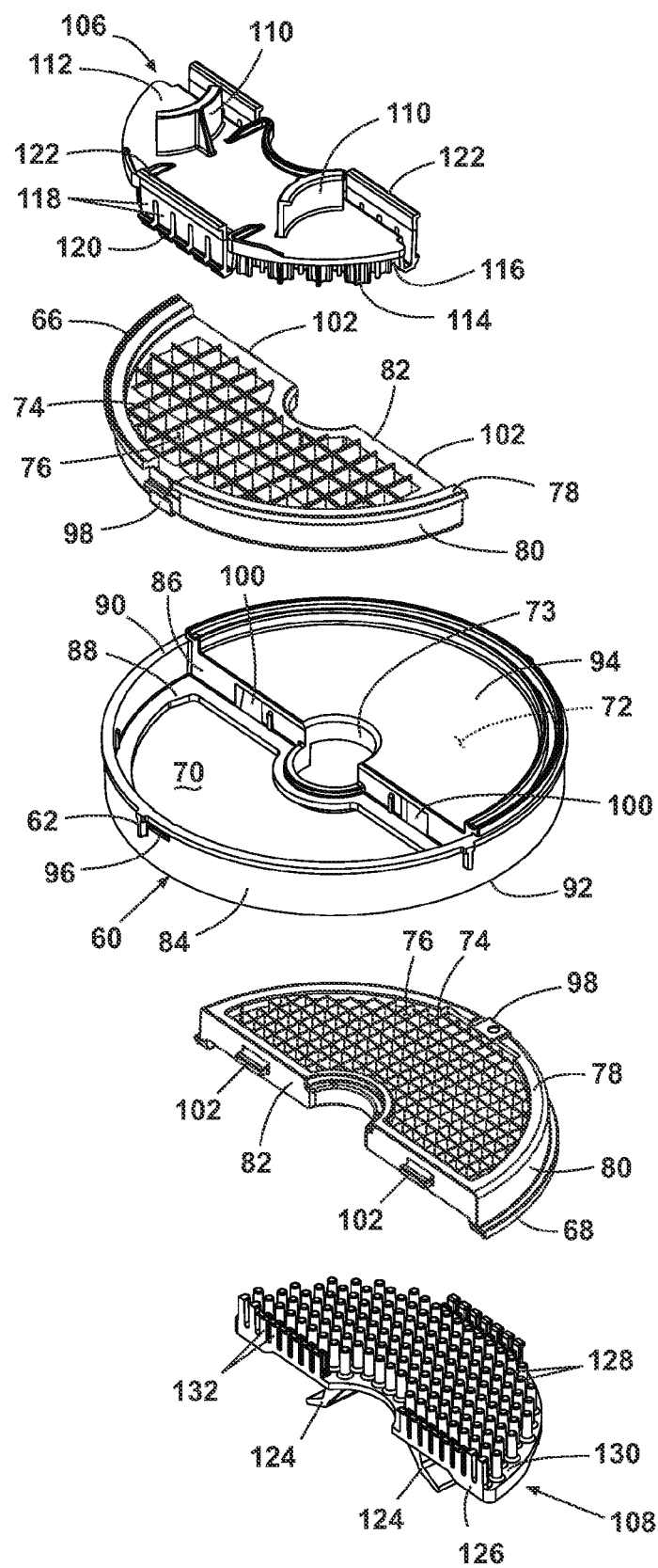
FIG. 4 is an exploded view of the dicing tool of the food processor of FIG. 1 and a first and second management tool according to a second embodiment of the invention.

Referring now to FIG. 4, the dicing tool 40 is described in detail in combination with management tools 106 and 108. Each of the first and second dicing elements 66 and 68 may include a housing 78 having a first, generally arcuate outer portion 80 and a second, generally straight inner portion 82 between which intersecting cutting elements 74 defining openings 76 extend. As illustrated, the first dicing element 66 may have larger openings 76 so as to have a processing capability of cubing a food item. The second dicing element 68 may have smaller openings 76 than the first dicing element 66 for finely dicing a food item. The openings 76 may be of any regular or irregular shape including circular or oval. The openings 76 of the first dicing elements 66 may have the same or different size and shape as those of the second dicing element 68. It is also within the scope of the invention for the openings 76 to be defined by non-intersecting, parallel cutting elements such that the food item is sliced as it passes through the first or second dicing elements 66 and 68. The cutting elements 74 may be made of metal or any material suitable for processing food. The cutting elements 74 may be sharp or have one or more sharpened edges for facilitating processing food.

The first and second dicing elements 66 and 68 may have a similar processing capability or different processing capabilities. For example, both the first and second dicing elements 66, 68 may have intersecting cutting elements such that the food is processed into different cube sizes. In another example, the first dicing element 66 may have intersecting cutting elements for processing the food into cubes while the second dicing element 68 has non-intersecting cutting elements for processing the food into slices or strips.

The first and second compartments 70 and 72 may be defined by a peripheral wall 84 of the frame 60 and a generally centrally located interior wall 86. The interior wall 86 may span the diameter of the ring shaped frame 60, interrupted generally at a center of the frame 60 by the central portion 73. The frame 60 may further comprise a ledge 88 extending from the peripheral wall 84 and the interior wall 86 partially into the first compartment 70 such that an opening to the first compartment 70 on a first side 90 of the frame 60 is larger than an opening to the first compartment 70 on a second side 92. In this manner, during a food processing operation, food in the food processing path may pass from the feed tube 24 through the cutting tool 20 and the first compartment 70 of the dicing tool 40 and into the bowl 18. The second compartment 72 may have a barrier wall 94 extending between the peripheral wall 84 and the interior wall 86, blocking access to the second compartment 72 from the first side 90 of the frame 60.

The second compartment 72 is not part of the food processing path 26 and therefore does not need to be open such that food may pass through. However, it is within the scope of the invention for the barrier wall 94 to only partially obstruct access to the second compartment 72. The barrier wall 94 may serve as an indicator to a user that the second compartment 72 is not part of the food processing path 26. An alternative method for indicating that the second compartment 72 is not part of the food processing path may include limiting the manner in which the frame 60 may be placed on the bowl 18, by varying the number and/or location of the keys 62 and keyways 47 such that when the frame 60 is coupled with the bowl 18 only the first compartment 70 is in the food processing path 26.

The peripheral wall 84 may include a first aperture 96 in both the first and second compartments 70, 72 for receiving a resilient detent 98 located on the outer portion 80 of the housing 78 when the first and second dicing elements 66, 68 are placed in the first and second compartments 70, 72. The interior wall 86 may also include a pair of second apertures 100 for receiving a pair of retaining lugs 102 projecting from the inner portion 82 of the dicing element housing 78 when the first and second dicing elements 66, 68 are placed in the first and second compartments 70, 72. As can best be seen in FIG. 7, the interior wall 86 may also include a pair of retaining tabs 104 projecting from a bottom edge of the interior wall 86 partially into the second compartment 72 for securing either the first or second dicing element 66, 68 when it is placed in the second compartment 72.

Referring still to FIG. 4, the first and second dicing elements 66 and 68 may further be provided with first and second management tools 106 and 108, respectively. The first and second management tools 106 and 108 may be used to remove food remaining within the dicing openings after a food processing operation and to facilitate handling of the dicing elements 66 and 68.

Figure 5A:
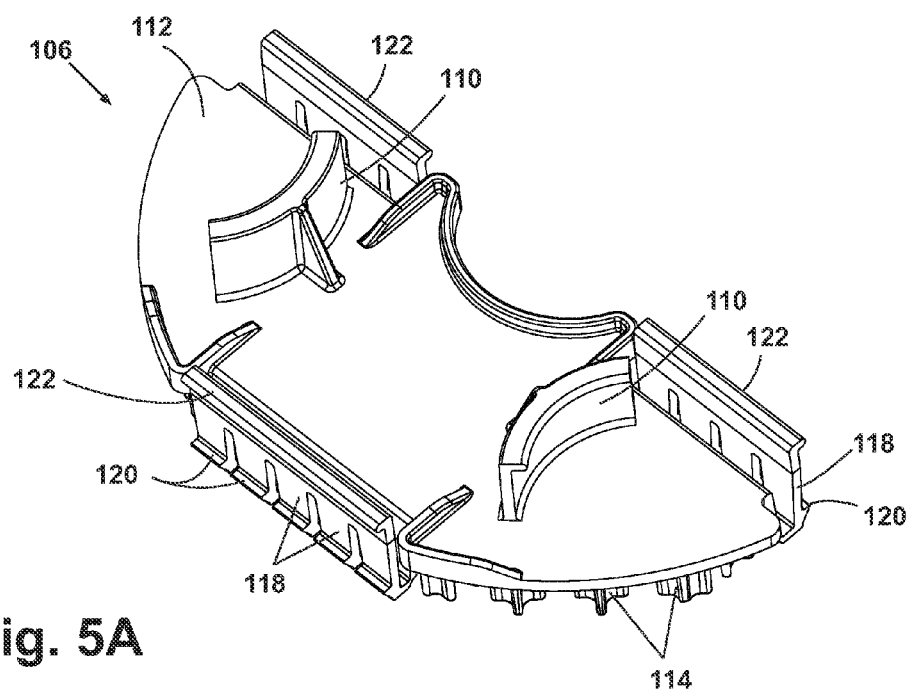
FIG. 5A is a top-down perspective view of the first management tool of FIG. 4.
Figure 5B:
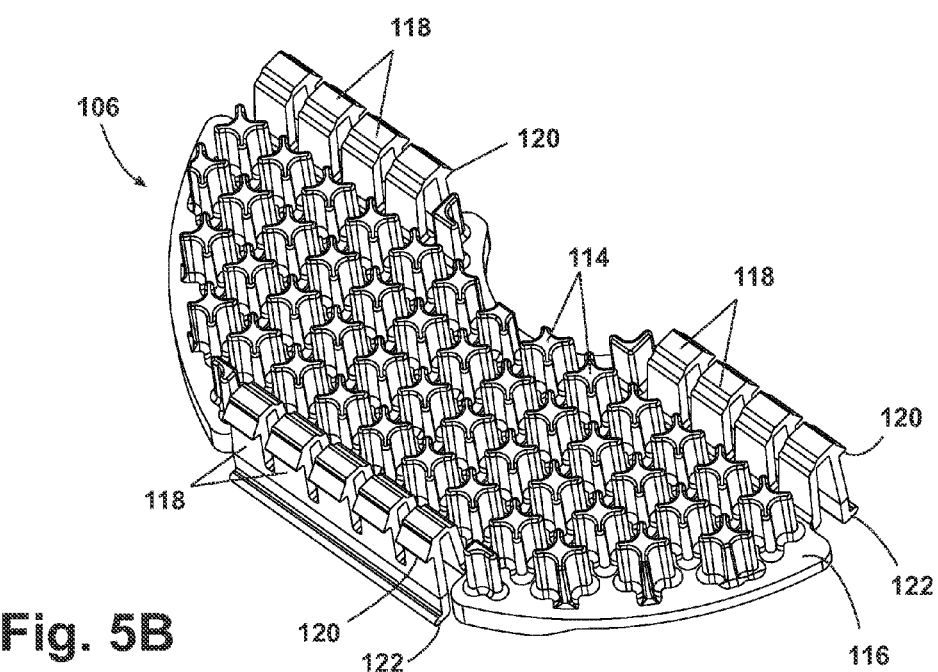
FIG. 5B is a bottom perspective view of the first management tool of FIG. 4.

Referring now to FIGS. 5A and 5B, the first management tool 106 has a pair of handles 110 in the form of a pair of fingers projecting from a first face 112 of the first management tool 106 and a plurality of projections 114 extending from a second face 116. The handles 110 may be spaced apart on the first face 112 such that a user can grasp the handles 110 with one hand for handling the first management tool 106. While the handles 110 are illustrated as projecting fingers, any suitable type of handle may be used without deviating from the scope of the invention. For example, the handles 110 may be in the form of one or more hooks or loops.

The projections 114 may be sized so as to be received within the dicing openings 76 of the first dicing element 66 for removing food that may remain within the dicing openings 76 after a food processing operation. The projections 114 may have a length equal to or greater than a depth of the cutting elements 74 which define the dicing openings 76, although it is also within the scope of the invention for the projections 114 to extend only partially through the dicing openings 76. While some of the projections 114 are illustrated as having an X-shaped cross-section, the projections 114 may have any shape and size suitable for being received within the dicing openings 76. The projections 114 may all have the same size and shape. Alternatively, the size and shape of the projections 114 may vary depending on their location on the management tool 106.

Figure 7:
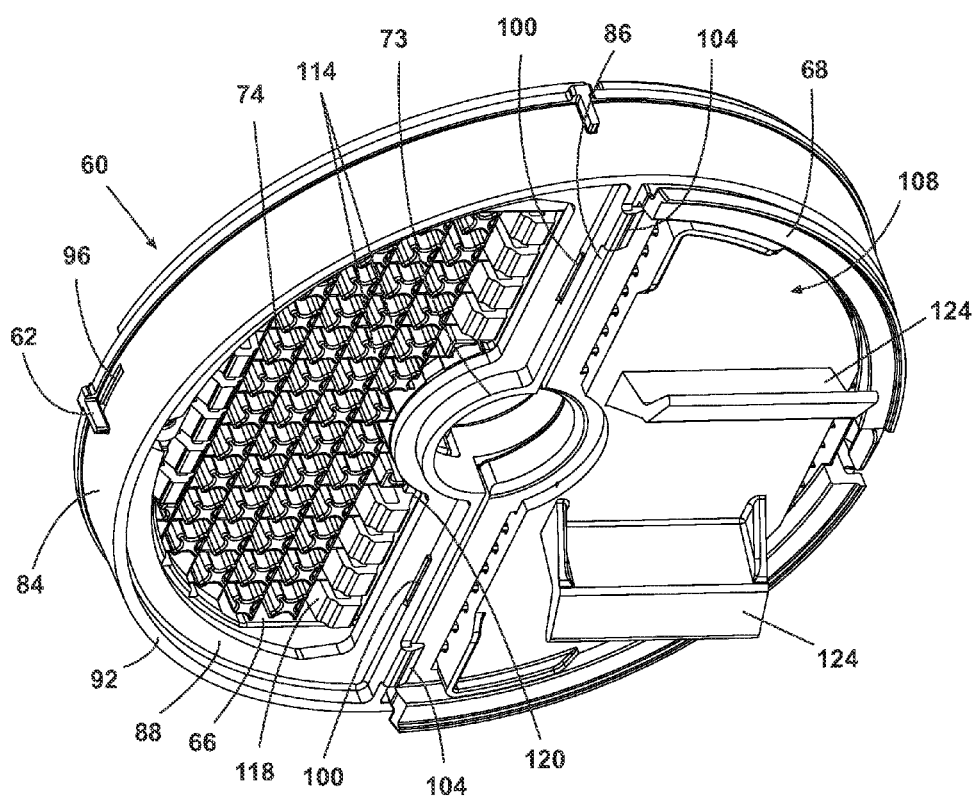
FIG. 7 is a perspective view of an assembled dicing element and first and second management tools according to the third embodiment of the invention.

Some of the projections 114 extending around at least a portion of the periphery of the first management tool 106 may have a U-shaped cross-section wherein at least one of the legs of the U-shaped projections is in the form of a resilient coupling element 118. The coupling element 118 may include a finger 120, for engaging the housing 78 of the first dicing element 66 when the first management tool 106 is coupled with the first dicing element 66. The coupling elements 118 may be resilient such that they are depressed from an initial, extended position as the finger 120 passes into and through the dicing openings 76 and then snap back to the extended position when the finger 120 exits the dicing openings 76. When the first management tool 106 is coupled with the first dicing element 66, the finger 120 engages the housing 78 when the coupling elements 118 are in their extended position (FIG. 7). Adjacent coupling elements 118 may be connected by a tab 122 extending at least partially above the first face 112 for selectively and simultaneously flexing the coupling elements 118 during insertion and/or removal of the first management tool 106. Flexing the coupling elements 118 facilitates moving the finger 120 from a position in which it is engaging the housing 78 when the first management tool 106 and first dicing element 66 are coupled to a position in which the finger 120 is no longer engaging the housing 78 for removal of the first management tool 106. In this manner, the coupling elements 118 removably couple the first management tool 106 to the first dicing element 66 such that the first dicing element 66 may be handled through the first management tool 106.

While the first management tool 106 is illustrated as having a plurality of projections 114 comprising a coupling element 118 for resiliently coupling the first management tool 106 with the first dicing element 66 through a snap-fit connection, the projections 114 may also couple the first management tool 106 with the first dicing element 66 through a press-fit connection in which the projections 114 are press-fit into the dicing openings 76. In this case, the coupling element 118 may be in the form of a resilient material and project from one or more projections 114 such that the overall dimension of the projection 114 is slightly larger than the dimensions of the dicing openings 76. Alternatively, at least some of the projections 114 may be made entirely of a resilient material and have dimensions larger than the dicing openings 76 for press-fitting with the dicing openings 76. In another example, all of the projections 114 of the first management tool 106 may couple with the first dicing element 66 through a press-fit connection.

Figure 6A:
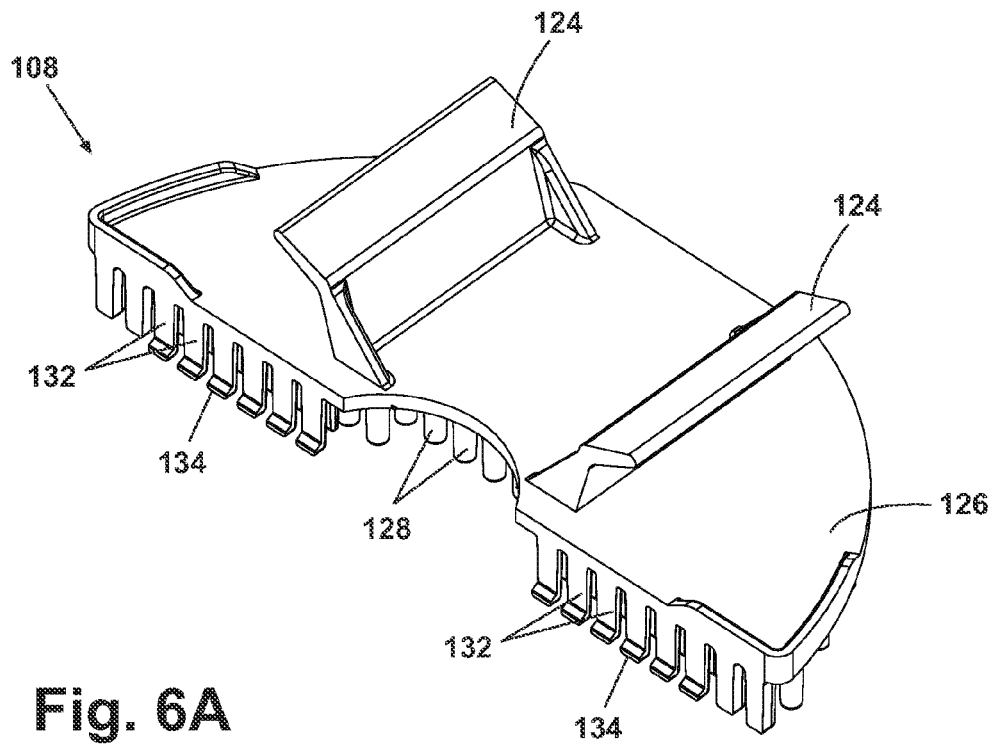
FIG. 6A is a top-down perspective view of the second management tool of FIG. 4.
Figure 6B:
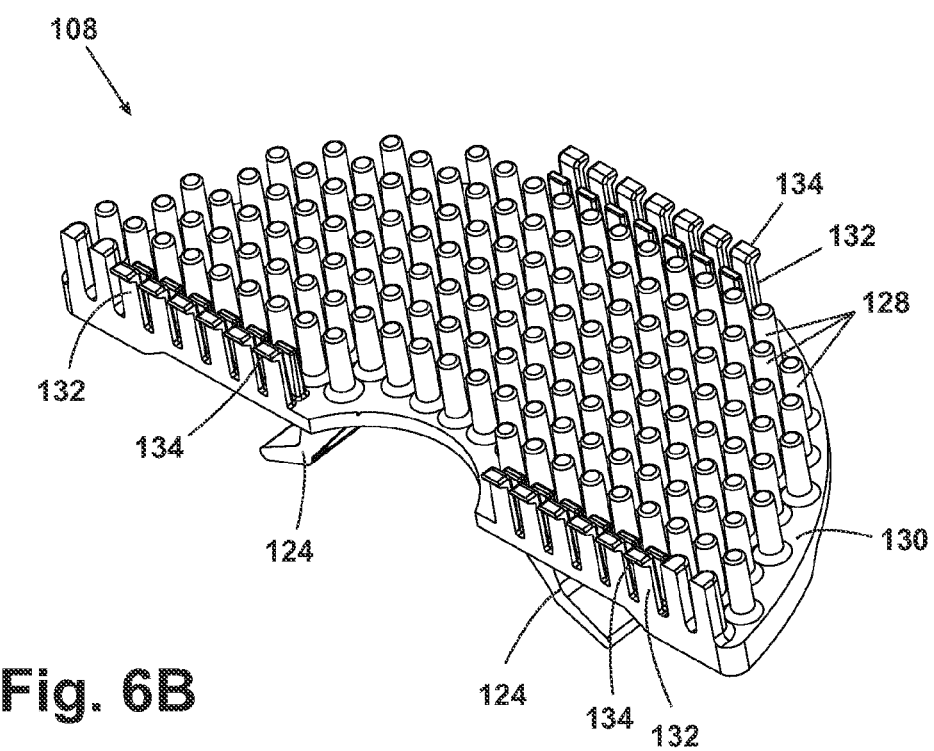
FIG. 6B is a bottom perspective view of the second management tool of FIG. 4.

Referring now to FIGS. 6A and 6B, the second management tool 108 is similar to the first management tool 106 and includes a pair of handles 124 in the form of a pair of fingers projecting from a first face 126 of the second management tool 108 for grasping by a user during handling of the second management tool 108. The second management tool 108 may also include a plurality of projections 128 extending from a second face 130 of the second management tool 106 for removing food that may remain within the dicing openings 76 after processing food. As discussed above with reference to the first management tool 106, the projections 128 may have any suitable size and shape so as to be received by the dicing openings 76 when the second management tool 108 is coupled with the second dicing element 68. As illustrated in FIGS. 6A and 6B, some of the projections 128 of the second management tool 108 have a generally circular cross-section.

Some of the projections 128 extending around at least a portion of the periphery of the second management tool 108 may be in the form of a resilient coupling element 132. The coupling elements 132 may include a finger 134 for engaging the housing 78 of the second dicing element 68 when the second management tool 108 is coupled with the second dicing element 68. The second management tool 108 may be coupled with the second dicing element 68 through a snap-fit connection with the coupling element 132 having the finger 134. Alternatively, similar to the first management tool 106, the second management tool 108 may be coupled with the second dicing element 68 through a press-fit connection.

While the first and second management tools 106 and 108 are described as having coupling elements 118 and 132, respectively, for coupling with the first and second dicing elements 66 and 68, other methods for coupling may also be used without deviating from the scope of the invention. For example, a dicing element may have a housing partially extending above the cutting elements which defines an area in which a management tool may be press-fit. In another example, a dicing element may have one or more latches that may be selectively coupled with an upper face of a management tool to releasably couple the management tool and the dicing element.

The projections 114 and 128 of the first and second management tools 106, 108 may be made from any suitable rigid, semi-rigid or resilient material. For example, the projections 114 and 128 may be made from a rigid dishwasher-safe polymeric material for pushing food out of the dicing openings 76. In another example, the projections 114 and 128 may be made entirely of a resilient dishwasher-safe material such as a resilient polymer. In yet another example, the projections 114 and 128 may include a core structure made from a rigid material and an exterior portion comprising a resilient or flexible material such as a series of brush bristles or flexible flaps. The coupling elements 118 and 132 may be made from the same material as the projections 114 and 128 or a different material. For example, the projections 114 and 128 may be made from a rigid plastic while the coupling elements 118, 132 are made from a resilient polymer. In yet another example, the coupling elements 118, 132 may be coupled with a rigid projection through a living hinge.

While the invention has been described in the context of a first and second management tool 106 and 108 for use with the first and second dicing elements 66, 68, respectively, it is within the scope of the invention for a single, interchangeable management tool to be used that can be removably coupled with multiple dicing elements 66, 68. It is also within the scope of the invention for the second management tool 108 to be identical to the first management tool 106, varying only in the size and shape of the projections 114, 128. Similarly, it is within the scope of the invention for the first management tool 106 to be identical to the second management tool 108, varying only in the size and shape of the projections 114, 128.

As illustrated in FIG. 7, the dicing tool 40 comprising the first and second dicing elements 66 and 68 and the first and second management tools 106 and 108 may be coupled together as a single unit for storage, handling and cleaning of the first and second dicing elements 66 and 68. Both the first and second management tool 106 and 108 may be coupled with the first and second dicing elements 66 and 68, respectively, regardless of which of the first and second compartments 70, 72 the dicing elements 66 and 68 are located.

Figure 8:
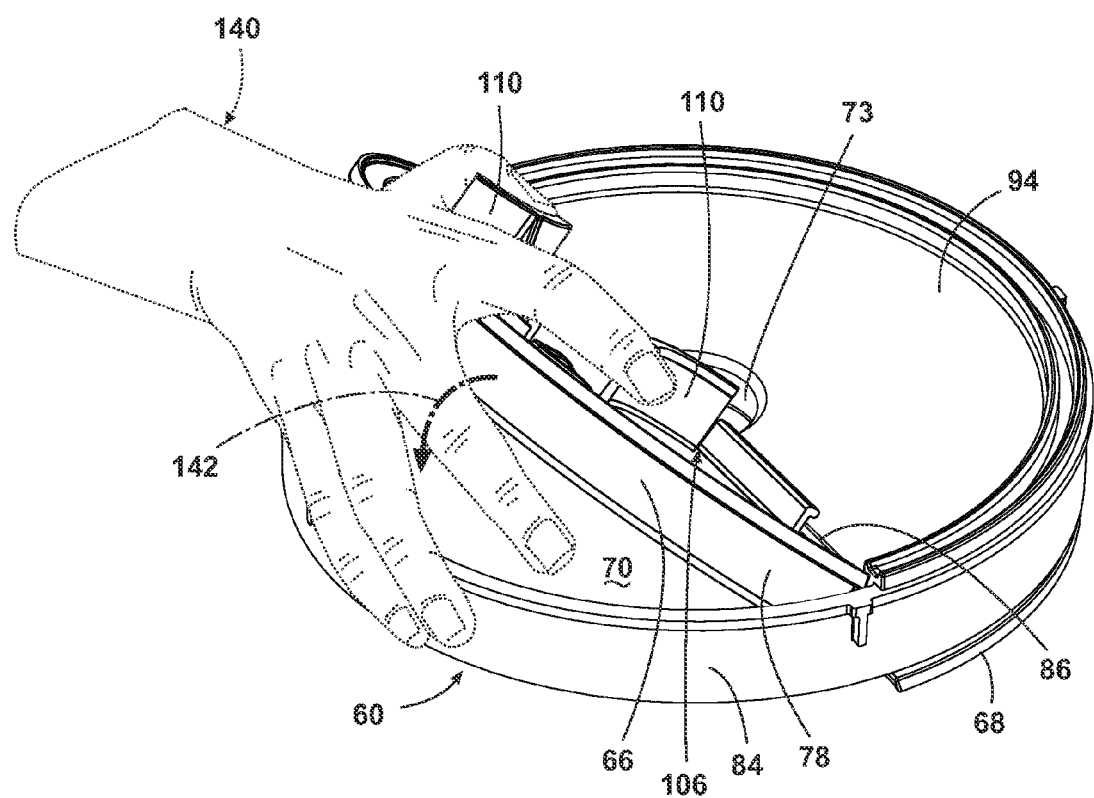
FIG. 8 is perspective view illustrating the use of a management tool to assemble a dicing tool according to a fourth embodiment of the invention.

Referring now to FIG. 8, a method for assembling the dicing tool 40 for a food processing operation with the food processor 10 will now be described. Once the dicing element 40 is assembled, a food processing operation may be completed with the food processor 10. Prior to using the dicing tool 40 with the food processor 10, the user places the desired dicing element, in this case the first dicing element 66, in the first compartment 70 of the frame 60. The user may place different dicing elements in the first compartment 70, the compartment which is placed within the food processing path 26, depending on the desired food processing operation. While the method is described in the context of using the first dicing element 66 in a food processing operation, it will be understood that the second dicing element 68 may be used in a similar manner.

The first management tool 106 may be coupled with the first dicing element 66 such that a user may handle the first dicing element 66 through the first management tool 106, minimizing the user's contact with the cutting elements 74. This facilitates safe and sanitary handling of the first dicing element 66. The first management tool 106 may be coupled with the first dicing element 66 by aligning the projections 114 with the dicing openings 76 and pressing the projections 114 into the dicing openings 76 until the fingers 120 on the coupling elements 118 engage the housing 78.

As illustrated in FIG. 8, a user 140 may grasp the first management tool 106, which is coupled with the first dicing element 66, by the handles 110 and place the inner portion 82 of the housing 78 of the first dicing element 66 in the first compartment 70, such that the retaining lugs 102 are received within the second apertures 100 in the interior wall 86. The user 140 may then press the outer portion 80 of the housing 78 downwards in the direction indicated by arrow 142 until the detent 98 of the first dicing element 66 snaps into the first aperture 96 on the frame 60. When assembled, the first dicing element 68 is supported within the first compartment 70 by the ledge 88 extending partially into the first compartment 70 (FIG. 7). In this manner, the user 140 may removably secure the first dicing element 66 within the first compartment 70 without contacting the cutting elements 74. It is also within the scope of the invention for the first dicing element 66 to be assembled with the frame 60 through a press-fit connection.

Prior to starting a food processing operation, the first management tool 106 may be removed by grasping the handles 110 and pulling the first management tool 106 in a direction upwards and away from the first dicing element 66 such that fingers teeth 120 of the coupling elements 118 disengage the housing 78. In the case of the first dicing element 66, this may be facilitated by pressing the tab 122 to disengage the fingers 120.

The assembled dicing tool 40 may then be placed within the lip 19 of the bowl 18 by placing it over the upper end 58 of the output shaft 16 such that the keys 62 on the frame 60 mate with a plurality of keyways 47 in the lip 19.

Alternatively, the first dicing element 66 may be placed in the first compartment 70 after the frame 60 is placed within the lip 19 and the first management tool 106 may then be removed.

Once the dicing tool 40 is placed within the lip 19, the user may then place the cutting tool 20 on the upper end 58 of the output shaft 16. The user may then position the lid 22 on the bowl 18 and deliver food through the feed tube 24 into the bowl 18. The user may then activate the motor 14 causing the drive shaft 41, output shaft 16, and cutting tool 20 to rotate. The food may be pushed down to the cutting tool 20 using the food pusher 28 where the food then contacts the cutting blade 52, at which point it is sliced and then it is pushed by the ramp portion 54 through the portion of the dicing tool 40 within the food processing path 26 and into the bowl 18. Depending on which of the first and second dicing elements 66 and 68 are in the first compartment 72, which is aligned with the food processing path 26, the dicing tool 40 may yield cubed or diced or cubed bits of food.

During the food processing operation with the first dicing element 66 as described above, the second dicing element 68 may be stored in the second compartment 72 along with the second management tool 108. In this manner, the dicing tool 40 may be used with minimal disassembly of the assembled dicing tool 40 and first and second management tools 106 and 108 illustrated in FIG. 7. This facilitates ease of use for the user and minimizes opportunities for the dicing elements and/or management tools to get lost or misplaced.

When the food processing operation is complete, the first management tool 106 may again be coupled with the first dicing element 66 to remove food remaining within the dicing openings 76. As the first management tool 106 is coupled with the first dicing element 66, the projections 114 push any food remaining in the dicing openings 76 through the dicing openings 76. As illustrated in FIG. 7, the projections 114 are slightly longer than the depth of the dicing openings 76 such that when the first management tool 106 and the first dicing element 66 are coupled, the projections 114 extend past the edges of the cutting elements 74, effectively pushing food out of the dicing openings 76 and away from the cutting elements 74.

Figure 9:
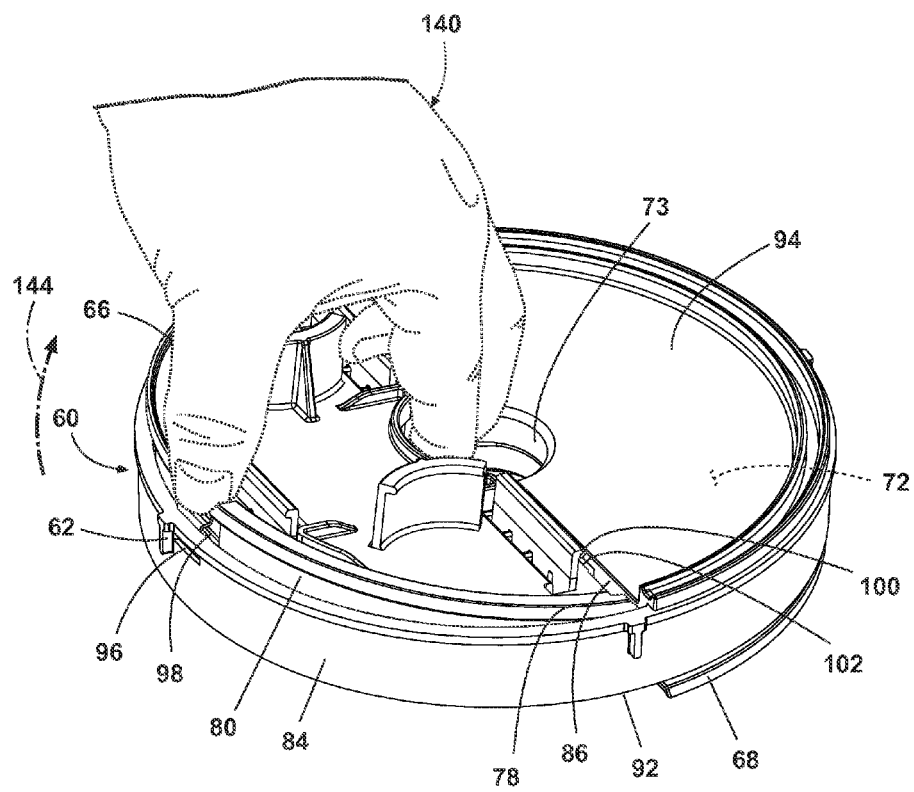
FIG. 9 is a perspective view illustrating the use of a management tool to disassemble a dicing tool according to the fourth embodiment of the invention.

If the user desires to use the second dicing element 68 in a food processing operation, the location of the first and second dicing elements 66 and 68 may be switched by placing the first dicing element 66 in the second compartment 72 and the second dicing element 68 in the first compartment 70, which is part of the food processing path 26. As illustrated in FIG. 9, to remove the dicing element 66 from the first compartment 70, the user 140 may grasp the housing 78 of the first dicing element 66 near the central opening 73, depress the detent 98 and lift the first dicing element 66 away from the first compartment 70 as illustrated by the arrow 144. The second dicing element 68 may be removed from the second compartment 72 in a similar manner and then placed in the first compartment 70 for use in a food processing operation in a manner similar to that described above for the first dicing element 66. The first dicing element 66 may be placed in the second compartment 72 for storage during a food processing operation with the second dicing element 68.

The first and second dicing elements 66, 68 may be removed from the first and second compartments 70, 72 while the first and second management tools 106, 108 are coupled with the first and second dicing elements 66, 68, respectively, as described above. However, the first and second management tools 106, 108 do not necessarily need to be coupled with the first and second dicing elements 66, 68 when removing them from the first and second compartments 70, 72.

After the completion of a food processing operation and subsequent cleaning of the first and/or second dicing elements 66, 68 used in the operation, the dicing tool 40 and first and second management tools 106 and 108 may be assembled as illustrated in FIG. 7 and placed in storage until the next food processing operation.

While the first and second management tools 106 and 108 are described as facilitating cleaning and handling of the first and second dicing elements 66 and 68, it is also within the scope of the invention for the first and second management tools 106 and 108 to only facilitate either cleaning or handling. For example, the first and second management tools 106 and 108 may only include projections 114, 128 having the coupling elements 118, 132 around the periphery of the management tools 106, 108 for removably coupling with the first and second dicing elements 66 and 68 for handling and switching the dicing elements 66, 68 between the first and second compartments 70, 72. Alternatively, the first and second management tools 106 and 108 may only include projections 114, 128 without the coupling elements 118, 132 for removing food remaining in the dicing openings 76 following a food processing operation, which do not couple with the first and second dicing elements 66 and 68 such that the management tools 106, 108 are not used to handle the dicing elements 66, 68.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention that is defined in the appended claims.

What is claimed is:

1. A food processing dicing element assembly, comprising:
a dicing element having multiple elements defining multiple dicing openings through which food may pass; and
a management tool having multiple projections sized to be received by the dicing openings, with at least some of the projections having at least one coupling element for releasably coupling the management tool to the dicing element, with at least one of the coupling elements located on at least a portion of an outer periphery of the management tool;
wherein the coupling element couples with the dicing element and a user may clean a portion of the dicing element using the management tool without touching the dicing element.

2. The food processing dicing element assembly according to claim 1, wherein the management tool comprises a handle to be grasped by a human hand to move the management tool to insert and remove the coupling element from the dicing openings.

3. The food processing dicing element assembly according to claim 2, wherein the handle is located on a side of the management tool opposite the coupling element.

4. The food processing dicing element assembly according to claim 2, wherein the handle comprises spaced fingers projecting from the management tool.

5. The food processing dicing element assembly according to claim 2, further comprising at least one handle extending from a side of the management tool opposite the projections for facilitating handling of the management tool.

6. The food processing dicing element assembly according to claim 1, wherein the projections are sized to extend at least the length of the dicing openings such that food remaining in the dicing openings is pushed out of the dicing openings when the management tool is coupled with the dicing element.

7. The food processing dicing element assembly according to claim 1, wherein the elements defining the multiple dicing openings have at least one sharp edge.

8. The food processing dicing element assembly according to claim 1, wherein the coupling element is press-fit into the dicing opening.

9. The food processing dicing element assembly according to claim 1, wherein the coupling element comprises a resilient projection.

10. The food processing dicing element assembly according to claim 9, wherein the dicing element comprises a housing supporting the multiple elements defining the dicing openings.

11. The food processing dicing element assembly according to claim 10, wherein the resilient projection comprises a finger that releasably engages the housing.

12. The food processing dicing element assembly according to claim 11, further comprising an extension coupling adjacent resilient projections extending towards a side of the management tool opposite a side having the projections for selectively flexing the resilient projections.

13. A food processing dicing element assembly, comprising
a dicing element having multiple dicing openings through which food may pass;
a frame configured to selectively retain the dicing element; and
a management tool having multiple projections sized to be received by the dicing openings, the management tool having at least one coupling element for releasably coupling the management tool to at least one of the dicing element and the frame.

14. The food processing dicing element assembly according to claim 13, further comprising a rotatable cutting tool.

15. The food processing dicing element assembly according to claim 14, wherein the rotatable cutting tool is selectively retained by the at least one of the frame and a cover.

16. The food processing dicing element assembly according to claim 13, wherein the rotatable cutting tool is a cutting disc having a planar portion and a cutting blade.

17. The food processing dicing element assembly according to claim 13, wherein when the projections are received within the dicing openings, the coupling element couples with the dicing element and a user may move the dicing element by moving the management tool without touching the dicing element.

18. The food processing dicing element assembly according to claim 13, wherein the dicing element includes at least one handle.

19. A method of processing food, comprising:
   providing a frame element;
   configuring the management tool with at least one resilient projection; and
   coupling the management tool to a dicing element; and
   positioning a dicing element having multiple dicing openings through which food may pass in the frame element with the management tool;
   wherein the resilient projections are releasably received in the dicing openings, and wherein the resilient projection couples with the dicing element to manipulate the dicing element without touching a cutting surface of the dicing element.

20. The method of processing food according to claim 19, wherein the projections are sized to extend at least the length of the dicing openings to remove a remaining food from the food processing method when the management tool is coupled with the dicing element.

* * * * *